United States Patent
Coates et al.

(10) Patent No.: US 7,226,656 B2
(45) Date of Patent: Jun. 5, 2007

(54) THERMOFORMABLE ACOUSTIC SHEET

(75) Inventors: Michael William Coates, Glen Iris (AU); Marek Kierzkowski, Ferntree Gully (AU)

(73) Assignee: I.N.C. Corporation, Oakleigh South (AU)

( * ) Notice: Subject to any disclaimer, the term of this patent is extended or adjusted under 35 U.S.C. 154(b) by 156 days.

(21) Appl. No.: 10/333,385

(22) PCT Filed: Jul. 19, 2001

(86) PCT No.: PCT/AU01/00880

§ 371 (c)(1),
(2), (4) Date: Sep. 19, 2003

(87) PCT Pub. No.: WO02/09089

PCT Pub. Date: Jan. 31, 2002

(65) Prior Publication Data

US 2004/0053003 A1     Mar. 18, 2004

(30) Foreign Application Priority Data

Jul. 19, 2000   (AU) .................................. PQ8830

(51) Int. Cl.
*A01K 1/015*   (2006.01)
*B32B 3/10*    (2006.01)
*B04B 1/82*    (2006.01)

(52) U.S. Cl. ...................... 428/221; 418/137; 181/284; 181/286

(58) Field of Classification Search ................ 428/137, 428/163, 175, 196, 219, 221; 181/284, 286
See application file for complete search history.

(56) References Cited

U.S. PATENT DOCUMENTS

| | | | |
|---|---|---|---|
| 3,899,380 A | 8/1975 | Pihlstrom | 156/181 |
| 3,994,363 A | 11/1976 | Hirao et al. | 181/33 G |
| 4,050,913 A * | 9/1977 | Roach | 96/381 |

(Continued)

FOREIGN PATENT DOCUMENTS

CA   2 350 477   5/2000

(Continued)

OTHER PUBLICATIONS

Samples of acoustic materials as summarized in Table 1 of Decision of a Delegate of the Commissioner of Patents of Australian Patent Office issued on Feb. 24, 2006, for Application No. 2003100331 (Australian counterpart application of present application).

*Primary Examiner*—N. Edwards
(74) *Attorney, Agent, or Firm*—Seed Intellectual Property Law Group PLLC (57) ABSTRACT

A thermoformable acoustic sheet formed by a compressed fibrous web including high melt and adhesive thermoplastic fibres in which the adhesive fibres are at least partially melted so that in the compressed web the adhesive fibres at least partially coat the high melt fibres and reduce the interstitial space in the fibre matrix. Also included is a method of producing a thermoformable acoustic sheet which includes the steps of heating a fibre web including high melt and adhesive thermoplastic fibres to at least partially melt the adhesive fibres and compressing the web to form a sheet so that the adhesive fibres at least partially coat the high melt fibres to reduce the interstitial space in the fibre matrix.

26 Claims, 6 Drawing Sheets

Sound Absorption versus Flow resistance
frequency 1000Hz, web weight 600g/m², 50mm air gap

U.S. PATENT DOCUMENTS

| | | | | |
|---|---|---|---|---|
| 4,152,474 A | 5/1979 | Cook et al. | | 428/137 |
| 4,830,140 A | 5/1989 | Fridh et al. | | 181/288 |
| 4,888,234 A | 12/1989 | Smith et al. | | 428/234 |
| 5,068,001 A | 11/1991 | Haussling | | 156/222 |
| 5,298,694 A | 3/1994 | Thompson et al. | | 181/286 |
| 5,410,111 A | 4/1995 | Stief et al. | | 181/286 |
| 5,459,291 A | 10/1995 | Haines et al. | | 181/286 |
| 5,492,580 A | 2/1996 | Frank | | 156/72 |
| 5,493,081 A | 2/1996 | Manigold | | 181/286 |
| 5,632,844 A | * | 5/1997 | Pate et al. | 156/290 |
| 5,635,270 A | * | 6/1997 | Fletcher | 428/81 |
| 5,721,177 A | 2/1998 | Frank | | 442/59 |
| 5,745,434 A | * | 4/1998 | Cushman | 367/1 |
| 5,773,375 A | 6/1998 | Swan et al. | | 442/340 |
| 5,824,973 A | 10/1998 | Haines et al. | | 181/286 |
| 5,832,685 A | 11/1998 | Hermanson | | 52/506.07 |
| 5,841,081 A | 11/1998 | Thompson et al. | | 181/286 |
| 5,866,235 A | 2/1999 | Fredrick et al. | | 428/182 |
| 5,886,306 A | 3/1999 | Patel et al. | | 181/290 |
| 5,968,629 A | 10/1999 | Masui et al. | | 428/77 |
| 5,981,411 A | 11/1999 | Brown | | 442/364 |
| 6,008,149 A | 12/1999 | Copperwheat | | 442/381 |
| 6,048,809 A | 4/2000 | Brow et al. | | 442/364 |
| 6,103,180 A | 8/2000 | Haeseker et al. | | 264/546 |
| 6,145,617 A | 11/2000 | Alts | | 181/290 |
| 6,256,600 B1 | 7/2001 | Bolton et al. | | 703/6 |
| 6,345,688 B1 | 2/2002 | Veen et al. | | 181/290 |
| 6,376,396 B1 | 4/2002 | Thorn et al. | | 442/136 |
| 6,419,729 B1 | * | 7/2002 | Duffy et al. | 96/17 |
| 6,514,889 B1 | * | 2/2003 | Theoret et al. | 442/320 |
| 6,541,105 B1 | * | 4/2003 | Park | 428/304.4 |
| 2001/0000162 A1 | 4/2001 | Fletemier | | 442/35 |

FOREIGN PATENT DOCUMENTS

| | | |
|---|---|---|
| EP | 0 909 680 A1 | 4/1999 |
| EP | 0 949 066 A2 | 10/1999 |
| GB | 2 322 862 A | 9/1998 |
| JP | 10-121597 | 5/1998 |
| WO | WO 88/09406 | 12/1988 |
| WO | WO 93/23596 | 11/1993 |
| WO | WO97/00989 | 1/1997 |
| WO | WO 98/18656 | 5/1998 |
| WO | WO 98/38370 | 9/1998 |
| WO | WO 98/53444 | 11/1998 |
| WO | WO 00/27671 | 5/2000 |
| WO | WO 00/53456 | 9/2000 |

* cited by examiner

THERMOFORMABLE ACOUSTIC SHEET

BACKGROUND OF THE INVENTION

This invention relates to materials for acoustic absorption. More particularly it relates to thermoformable acoustic sheets.

Sounds absorption is required in a wide variety of industrial and domestic applications. In many of these applications it is desirable that the acoustic material conforms to the shape of a surface for example or otherwise retains a particular shape. In such applications it is desirable that the acoustic sheet can be heat moulded to the required shape to provide relative ease and speed of production. Sound absorption can be a function of depth of air space, air flow resistance, mass, stiffness and the acoustic impedance of any porous media behind the acoustic sheet. Therefore, adding a third dimension for example by moulding to a required shape increases stiffness and can add practical and aesthetic value. Importantly a three dimensionally shaped material provides its own air space. The shape therefore has a major influence on sound absorption and stiffness. One particular application for heat mouldable or thermoformable acoustic sheets is in the automotive industry, in particular, in under bonnet insulators for motor vehicles. Existing under bonnet insulators use moulded fibreglass insulators for sound absorption. In these products resinated fibreglass, or felt is sandwiched between two layers of non-woven tissue and subsequently heat molded to form a so called "biscuit" with sealed edges. The difficulties associated with this product include the fact that the moulding process is relatively slow taking up to 2½ minutes per moulded part. Additionally, the use of resinated fibreglass is undesirable because of its inherent undesirable handling problems while the resins can release toxic gases during the moulding process.

Other examples of applications for thermoformable sheets in the automotive industry include wheel arch linings, head linings and boot linings.

Attempts to produce a suitable thermoformable material from thermoplastic textile for underbonnet insulator have been unsuccessful due to one or more of the failure of the materials to meet requirements of low sag modulus typically encountered at operating temperatures, unsuitable moulding performance, and lack of uniformity of air flow resistance required for acoustic absorption performance.

It is an object of this invention to provide a thermoformable acoustic sheet and a method of producing such a sheet that will at least provide a useful alternative.

SUMMARY OF THE INVENTION

In one aspect this invention provides a thermoformable acoustic sheet formed by a compressed fibrous web including high melt and adhesive thermoplastic fibres. During forming the adhesive fibres are at least partially melted so that in the compressed web the adhesive fibres at least partially coat the high melt fibres and reduce the interstitial space in the fibre matrix.

In one form of the invention, the thermoplastic fibres are treated with an adhesive coating to increase the airflow resistance.

In another form of the invention, the thermoplastic fibres are treated with a coating formed by one or more further webs of thermoplastic fibres to increase the air flow resistance.

Preferably the further web contains a substantial amount of adhesive fibre.

In another aspect this invention provides a method of producing a thermoformable acoustic sheet including the steps of heating a fibre web including high melt and adhesive thermoplastic fibres to at least partially melt the adhesive fibres and compressing the web to form a sheet. In the compressed sheet the adhesive fibres at least partially coating the high melt fibre to reduce the interstitial space in the fibre matrix.

In one form of the method of the present invention, the sheet is treated with an adhesive coating to increase the air flow resistance.

In another form of the method of the present invention, the thermoplastic fibres are treated with a coating formed by one or more further webs of thermoplastic fibres to increase the air flow resistance.

The compression of the fibrous material under heat and pressure results in the at least partial melting of the adhesive fibre which acts as a heat activatable binder to at least partially coat and join to the high melting fibre thus reducing interstitial space in the fibre matrix and creating a labyrinthine structure that forms a tortuous path for air flow through the fibre matrix. The high melting fibre remains substantially intact, although some softening is acceptable and can act as a reinforcement in the acoustic sheet.

Preferably, the acoustic sheet has a total air flow resistance of between 275 and 1100 mks Rayl, more preferably 600–1100 mks Rayl and even more preferably 900–1000 mks Rayl. Such air flow resistance values of the acoustic sheet result in effective absorption of sound for applications such as hood or under bonnet insulation. In this regard the acoustic sheet produced in accordance with the present invention exhibit the acoustic behaviour of a porous limp sheet. Porous limp sheets display superior sound absorption at low frequencies.

Preferably, the thermoformable acoustic sheet has a low sag modulus at temperatures up to about 150° C.

The fibrous material can be a combination of fibres of various denier. The high melt fibres are 12 denier or below, 6 denier or below and/or 4 denier or below. The adhesive fibres are 8 denier or below, 6 denier or below, 4 denier or below and/or at about 2 denier.

The fibrous material can be selected from, but not limited to, polyester, polyethylene terephthalate (PET), polyethylene butylphthalate (PBT), polyethylene 1,4-cyclohexanedimethanol (PCT), polylactic acid (PLA) and/or polypropylene (PP). Fibre with special characteristics such as high strength or very high melting point can also be used. Examples include Kevlar™, Nomex™ and Basofil™. Alternatively, the high melting point fibres may be substituted by natural fibre such as wool, hemp, kanet etc.

The web of fibrous material used to produce the acoustic sheet of this invention can be produced from a non-woven vertically aligned high loft thermally bonded material formed by the STRUTO™ process under Patent WO 99/61693. Suitable low and high melt materials can be used to provide the respective fibres.

The web of fibrous material used to produce the acoustic sheet of this invention can also be produced by cross-lapping and thermal bonding. The web can also be produced by carding fibres and consolidation by needle punching. According to another option the web can be produced by other non-woven textile manufacturing methods such as melt blown, spun bond etc.

Adhesive fibres are also known as low melt, bonding or binding fibres. Various materials can be used for the high melt and adhesive fibres so long as the adhesive fibre can be partially melted without substantially melting the high melt fibre. Some softening of the high melt fibre is acceptable. The high melt fibre preferably has a melting point above about 220° C. The adhesive fibre preferably has a melting point between 100 and 160° C., more preferably 120–150° C. and even more preferably 135–145° C. It will be appreciated that thermoplastic fibres are available in mono and bi component form. A bicomponent fibre can be formed of discrete low and high melting point portions. Heating such a bicomponent fibre ("adhesive bicomponent fibre") results in at least partial melting of the low melting point portion leaving the higher melting point portion intact. Therefore in the method of the present invention, heating a fibre web results in at least partial melting of the adhesive fibres and/or the low melting point portion of any adhesive bicomponent fibres present in the web to at least partially coat and join to the high melting fibre. The higher melting point fibres and high melting point portions of any adhesive bicomponent fibre remain intact after the compaction process.

The web of fibrous material used to produce the acoustic sheet preferably has a web weight 1000 g/m$^2$ or below, more preferably 800 g/m$^2$ or below, even more preferably 600 g/m$^2$ or below and even further preferably 400 g/m$^2$ or below. The web is typically compressed by between 15 and 25 times.

The compression step of the method of the present invention can be undertaken in any suitable known manner, for example in any flat bed laminator or calender.

In one embodiment, the fibrous material is produced as a single layer with a high proportion, preferably greater than 50% of adhesive and/or adhesive bicomponent fibre. This may be compacted in a Meyer™ flat bed laminator at 180–220° C., preferably at 190–200° C., for a period of 1–3 minutes, preferably 1.5–2 minutes. The processing conditions can be varied to alter the thickness and/or other characteristics and the subsequent air flow resistance of the acoustic sheet.

In one form of the invention, the thermoplastic fibres are treated with an adhesive coating. The coating treatment can be effected in any suitable known manner, for example by the application of an adhesive film or an adhesive powder and subsequent heating. The amount of adhesive treatment can be adjusted to control the total air flow resistance of the thermoformable acoustic sheet. The adhesive can be a cross-linking adhesive powder. The application rate of powder is dependent on particle size, melting point, melt flow properties and polymer type. These types of adhesive have an initial curing temperature that can be exceeded after curing and cooling without remelting of the adhesive. Suitable adhesives include the product SURLYN™ manufactured by DuPont. Typical polymers for the adhesive film and/or powder are co-polyester, polyethylene and/or polypropylene.

In one form of the invention, where the adhesive coating is an adhesive powder, a layer of non-woven fabric or other material may be laminated to the compressed thermoplastic sheet using the adhesive powder.

Preferably the compression and coating treatment steps are performed in a single process. That is, heating required prior to the compression and for adhesive melting (to form the coating) can be a single step before compression.

In another form of the invention, the compression of the thermoplastic fibre and the lamination to the non-woven fabric are achieved in a single process. Preferably a compression and adhesive melting temperature of about 200° C. is used.

In another form of the invention, the coating by use of a web of thermoplastic fibres may be effected by the application of multiple webs of fibrous material which are introduced in parallel into the compaction process, and compacted concurrently. Alternatively, the web(s) can be introduced in one or more further compacting steps after the first web of fibrous material including adhesive and high melt thermoplastic fibres has been compacted. The further web(s) of fibrous material can include adhesive fibre, adhesive bicomponent fibre and/or high melt fibre. The amount and type of additional fibrous material can be adjusted to control the total air flow resistance of the thermoformable acoustic sheet.

In one form of the invention the thermoformable acoustic sheet can be formed from a first web preferably comprising 10–40%, further preferably 20% high melting point fibre and a second web of fibrous material, preferably comprising 60–100% further preferably more than 70%, even further preferably 100% adhesive or adhesive melt bicomponent fibre. The two webs can be compacted concurrently and adhere to each other without the need for an adhesive layer.

In another form of the invention the thermoformable acoustic sheet may be formed from two webs in which one of the webs may have a relatively low proportion of adhesive or adhesive bicomponent fibre, such as 10–50% preferably 20–25%. The webs can be compacted as described above. However, in this embodiment, a thermoplastic adhesive layer may be required to be introduced between the two webs, in the form of a powder. The addition rate of the powder is preferably within the range 10 and 80 g/m$^2$, more preferably 40–60 g/m$^2$. If a film is used rather than a powder it must be thin enough to become permeable during the compaction process, preferably from 15–25 microns thick. The adhesive may be required if the compressed webs exhibit recovery after compaction, or if they do not compact sufficiently for adequate sound absorption.

The mouldable acoustic sheet according to this invention has been found to be particularly suitable for use in automotive applications and in particular as an under bonnet acoustic liner. The thermoformable acoustic sheet can be readily formed using a moulding temperature of between 150° and 180° C. and may require use of flame retardant fibres or an additional flame retardant treatment. Suitable additives as flame retardants are deca-bromodiphenyloxide as supplied by Great Lake Chemicals. High melt fibres having improved inherent flame retardant characteristics may be used, for example a grafted polyester such as Trevira™ CS. The moulded sheet substantially retains the air flow resistance of the unmoulded sheet and thus its acoustic properties. Moreover, the sheet has a low sag modulus at temperatures up to about 150° C. and is suitable for use as an under bonnet insulator or liner.

For hood insulator applications, the appearance must be consistent and low gloss. Appearance can be influenced by the fibre properties and binder fibres tend to develop gloss during compaction and subsequent molding. To minimise gloss, the option of using an additional layer of fibrous material as the coating with each layer having significantly different fibre blend ratios is preferred. A face web should have a relatively low proportion of binder fibre, preferably 10–20% and a back web should have a very high binder ration, from 60–100%, preferably 80%. The back web will significantly contribute to flow resistance to assure excellent sound absorption, whilst the facing web assists in resisting marring during the process.

The thermoformable material of this invention is also suitable for use in wheel arch linings, head linings and boot linings. In most applications the selected air flow resistance of the moulded sheet can be used in combination with an acoustic cavity or space behind the sheet to achieve desired acoustic absorption.

In another form of the invention the uniform air flow resistance can be at least partially achieved by laminating a textile layer with selected air flow resistance to the compressed sheet. The layer can for example be a slit or perforated thermoplastic film or textile layer.

BRIEF DESCRIPTION OF THE DRAWINGS

The invention will now be described by way of example only with reference to the accompanying drawings and examples, in which.

DESCRIPTION OF THE PREFERRED EMBODIMENTS

Figure 1:
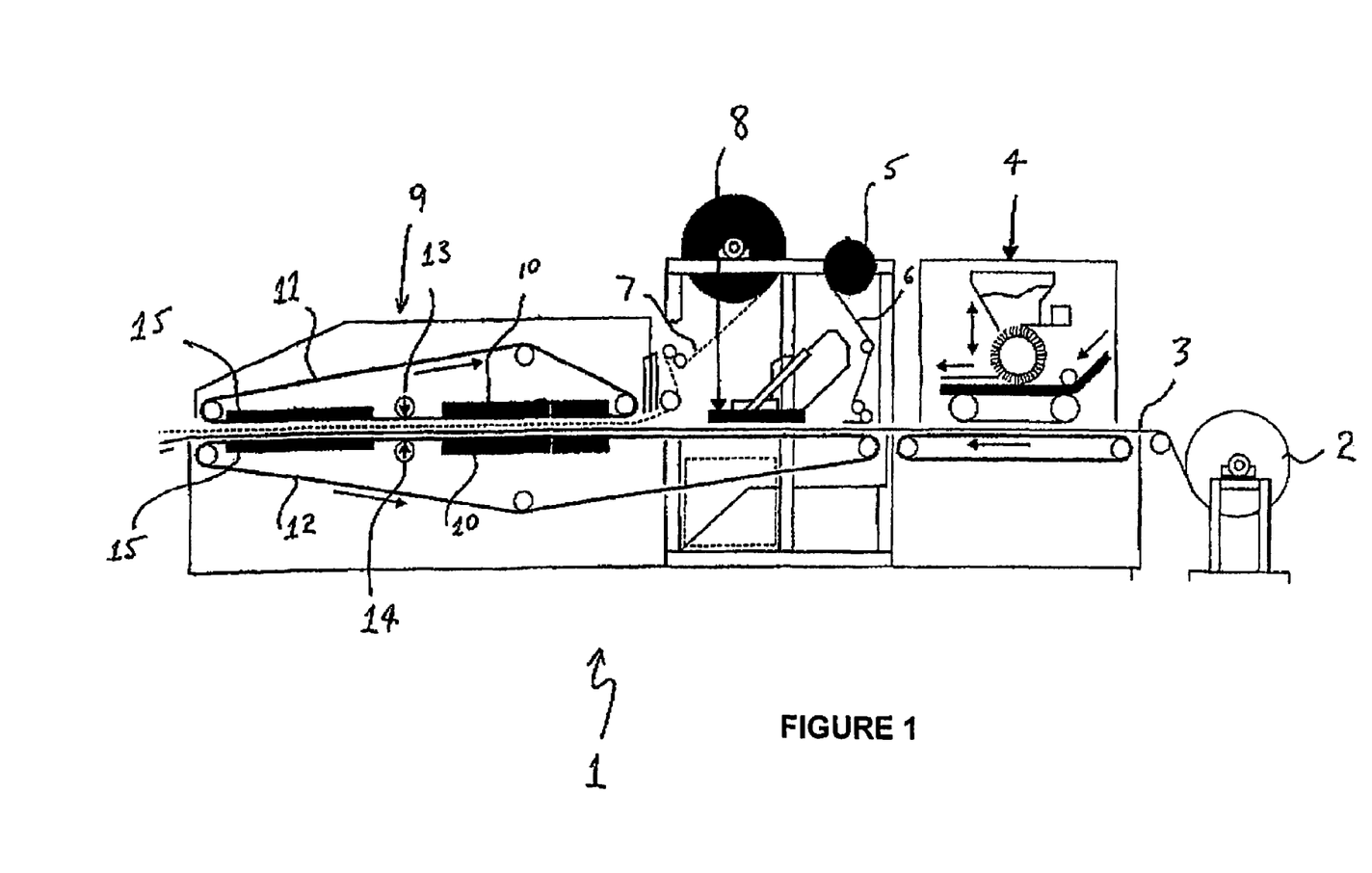
FIG. 1 is a schematic diagram of a flat bed laminating machine.

The present invention can be implemented using a known laminating machine such as a Meyer laminating machine schematically illustrated in FIG. 1. As shown in the drawing the laminating machine 1 includes a web supply roll 2.

The web 3 is fed to a heat contact system 9, which is readily known to those in the art as including heaters 10 positioned on either side of two opposed parallel belts 11 and 12. The belts 11, 12 are thus heated and in turn heat the web 3 to about 200°. A pair of adjustable pressure rollers 13, 14 bear against the respective belts 11, 12 to compress the web 3. A subsequent cooling system 15 is provided to cool the compressed product.

In the case of a product made using a thermoplastic adhesive powder, the web 3 is fed from the supply roller through a scatter head 4 which applies the thermoplastic adhesive powder to the surface of the web 3. A winding system 5 for thermoplastic adhesive film 6 is also provided in the machine 1. It will be apparent to those skilled in the art one or other of the scatter head system 4 or unwinding system 5 for thermoplastic adhesive film 6 is to place adhesive in contact with web 3. As described above, the web 3 then continues through heat contact system 9 where the thermoplastic adhesive powder is melted under the action of heated belts 11, 12 as the web 3 is simultaneously compressed under the action of pressure rollers 13, 14. Cooling system 15 cools the final product as described above.

Where a further fabric layer or web is to be provided, a supply of fabric or web 7 is stored on a roll 8 prior to entry into the heat contact system 9 so that the fabric web 7 is fed to the heat contact system 9 simultaneously with web 3. Where a thermoplastic adhesive has been deposited on web 3 by scatter head system 4 or unwinding system 5, the heated belts 11, 12 heat the fabric 7 and web 3 to melt the adhesive. Pressure rollers 13, 14 bear against the respective belts 11, 12 to force fabric 7 into contact with web 3 and the melted adhesive. Again, as described above, the web 3 is compressed and the cooling system 15 cools the compressed and laminated product.

Test Results

EXAMPLE 1

A sample was prepared using the above described machine and tested using an impedance tube with a 50 mm air gap to ASTME E 1050-90. The properties of the sample were:

carrier formulation 30% polypropylene (adhesive fibre) and 70% polyester (high melt);
web material was a needle punched mixture in roll form;
carrier web weight 450 g/m$^2$; and
polyester non-woven fabric facing web weight 50 g/m$^2$ adhered with a small (15–20 g) of polypropylene powder.

The average air flow resistance of the sample was 300–400 mks Rayls.

Figure 2:
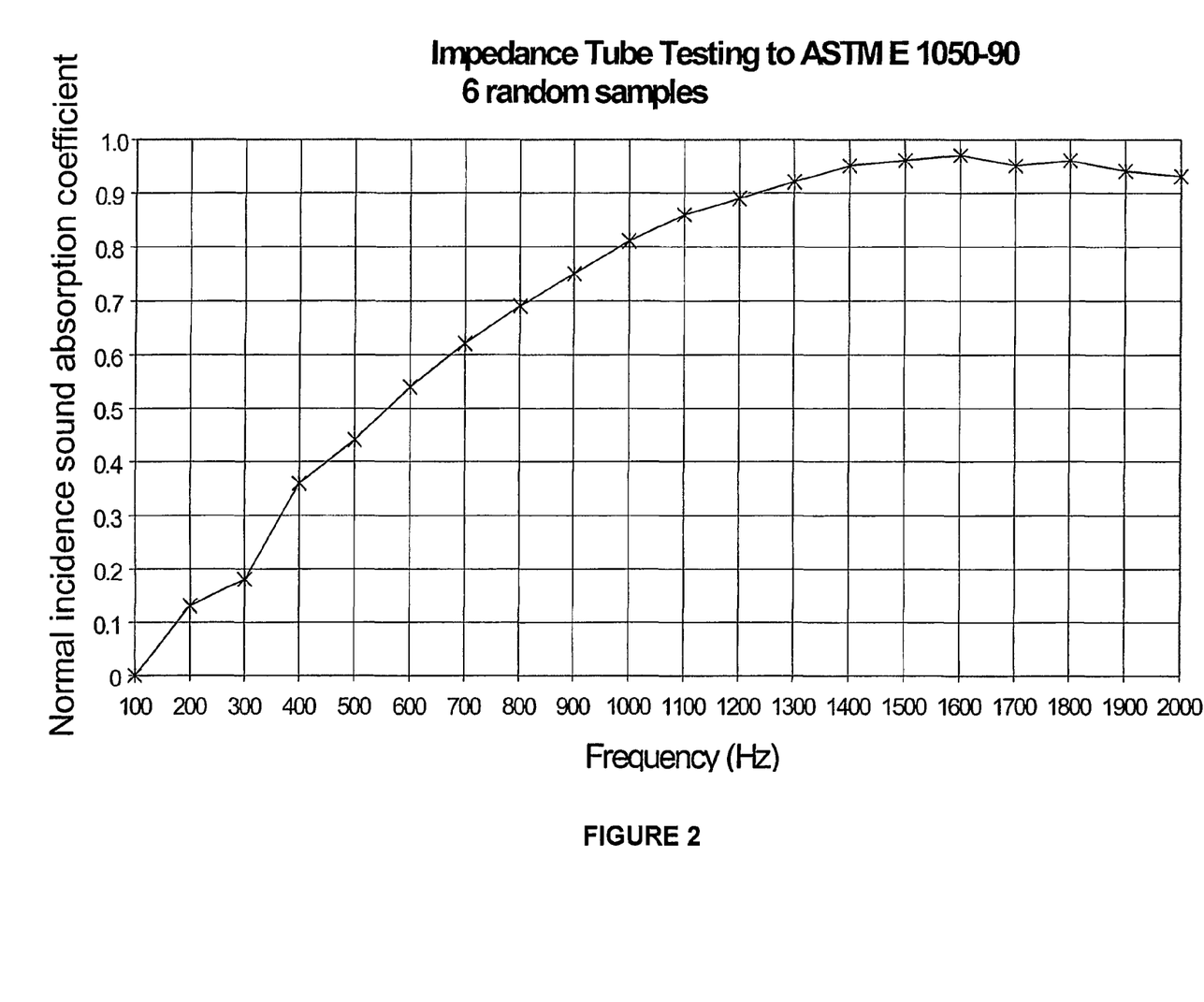
FIG. 2 is a plot of normal incidence sound absorption coefficient against frequency for tested samples of this invention.

FIG. 2 is a plot of average incident sound absorption versus frequency for six randomly selected samples prepared according to this example.

EXAMPLE 2

A sample was prepared and tested in the same manner as in Example 1 with the following specifications:
50% high melt fibre of 6 denier;
50% adhesive fibre of 4 denier; and
web weight 700 g/m$^2$.

The air flow resistance of the sample was in the range of 300–400 mks Rayls.

EXAMPLE 3

A sample was prepared and tested in the same manner as in Example 1 with the following specifications:
30% high melt polyester fibre of 6 denier;
70% adhesive polyester fibre of 4 denier;
web weight 600 g/m$^2$.

The air flow resistance of the sample was in the range of 700–850 mks Rayls.

EXAMPLE 4

A sample was prepared and tested in the same manner as in Example 1 with the following specifications:
50% high melt polyester fibre of 6 denier;
50% adhesive bicomponent polyester fibre of 4 denier; and
web weight 600 g/m$^2$.

Figure 3:
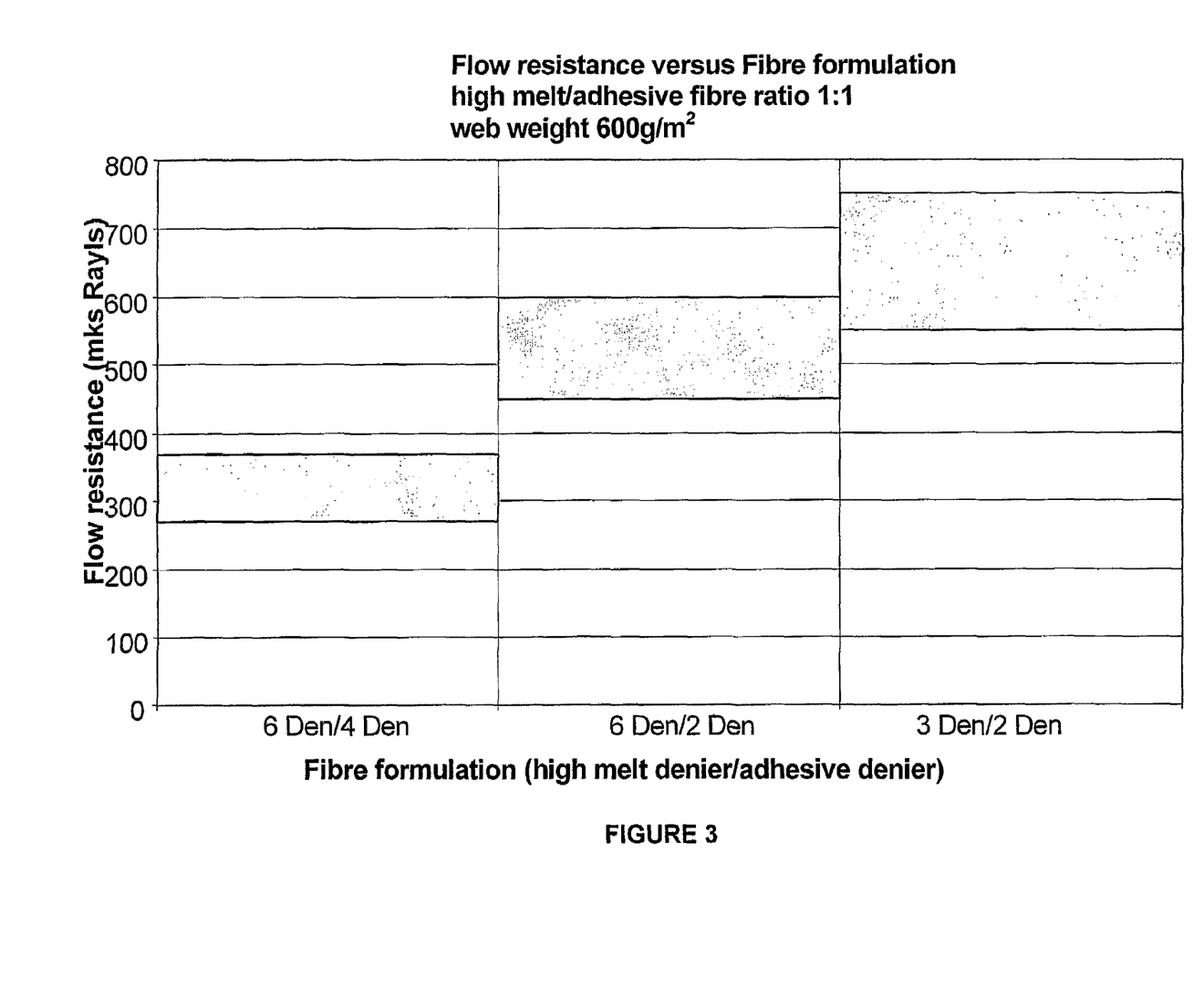
FIG. 3 is a plot of flow resistance versus fibre formulation for samples having a high melt/adhesive fibre ratio of 1:1 and web weight of 600 g/m$^2$.

As shown in FIG. 3, the air flow resistance of the sample was in the range of 275–375 mks Rayls.

EXAMPLE 5

A sample was prepared and tested in the same manner as in Example 1 with the following specifications:
50% staple high melt polyester fibre of 6 denier;
50% adhesive bicomponent polyester fibre of 2 denier; and
web weight 600 g/m$^2$.

As shown in FIG. 3, the air flow resistance of the sample was in the range of 450–600 mks Rayls.

EXAMPLE 6

A sample was prepared and tested in the same manner as in Example 1 with the following specifications:
50% high melt polyester fibre of 3 denier;
50% adhesive polyester fibre of 2 denier; and
web weight 600 g/m².
As shown in FIG. 3, the air flow resistance of the sample was in the range of 550–750 mks Rayls.

EXAMPLE 7

A sample was prepared and tested in the same manner as in Example 1 with the following specifications:
30% high melt polyester fibre of 4 denier;
70% adhesive bicomponent polyester fibre of 2 denier; web weight 250 g/m²;
spun bonded non-woven fabric polyester with a web weight of 100 g/m²;
polyethylene thermoplastic powder at an application rate of 20 g/m²; and
dibromophenyloxide flame retardant additive at an application of 25 g/m².
The air flow resistance of the sample was in the range of 700–900 mks Rayls.

EXAMPLE 8

A sample was prepared and tested in the same manner as in Example 1 using two webs of fibrous material with the following specifications:
180 g/m² 30% bicomponent polyester fibre of 2 denier and 70% high melt black 4 denier polyester fibre; and
300 g/m² 100% 2 denier bicomponent fibre.
The two webs of the above specification were introduced to a Meyer laminator at the following settings.
pressure 15 KPa;
distance between top and bottom belt 1 mm;
first bank of heaters temperature 175° C.; and
second bank of heaters temperature 190° C.
This resulted in a flow resistance of 900–1100 mks Rayls.

EXAMPLE 9

A sample was prepared and tested in the same manner as in Example 8:
Web 1
85% high melt polyester fibre with 4 denier;
15% adhesive bicomponent polyester fibre of 2 denier; and
web weight 180 g/m².
Web 2
30% staple high melt polyester fibre of 4 denier;
70% adhesive bicomponent polyester fibre of 2 denier; and web weight 250 g/m².
The air flow resistance of the sample was in the range of 700–900 mks Rayls.

EXAMPLE 10

Figure 4:
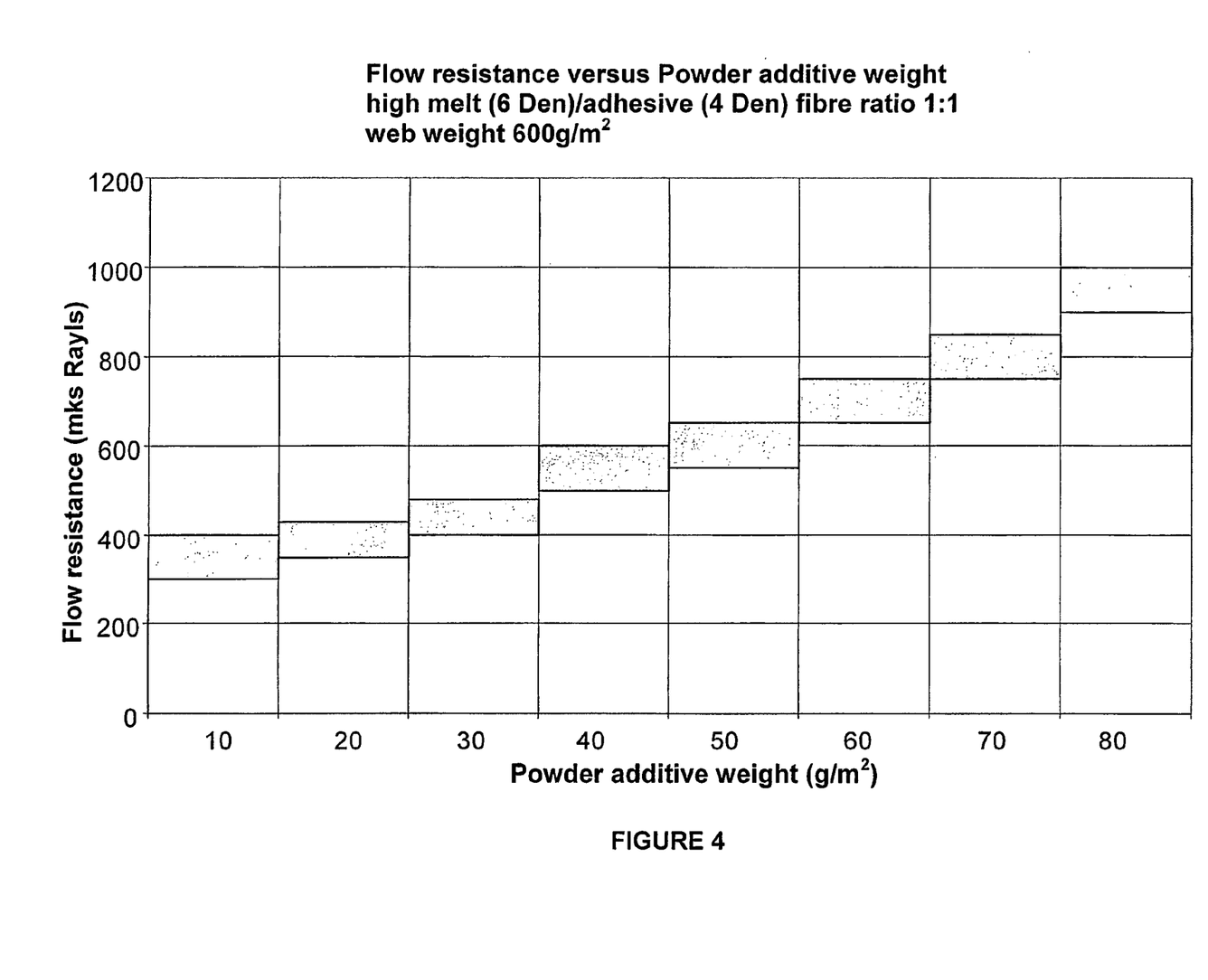
FIG. 4 is a plot of flow resistance versus powder additive weight for samples having a high melt (6 denier)/adhesive (4 denier) fibre ratio of 1:1, and a web weight of 600 g/m$^2$.

Samples were prepared and tested in the same manner as in Example 1 with the following specifications:
50% high melt polyester fibre of 6 denier;
50% adhesive polyester fibre of 4 denier; web weight 600 g/m²; and
varying application rates of LDPE adhesive powder.
Eight samples were made, each with the application rate of the adhesive powder varying from 10 g/m² to 80 g/m² in 10 µm² intervals. A plot of the resulting air flow resistance of each sample is shown in FIG. 4.

Figure 5:
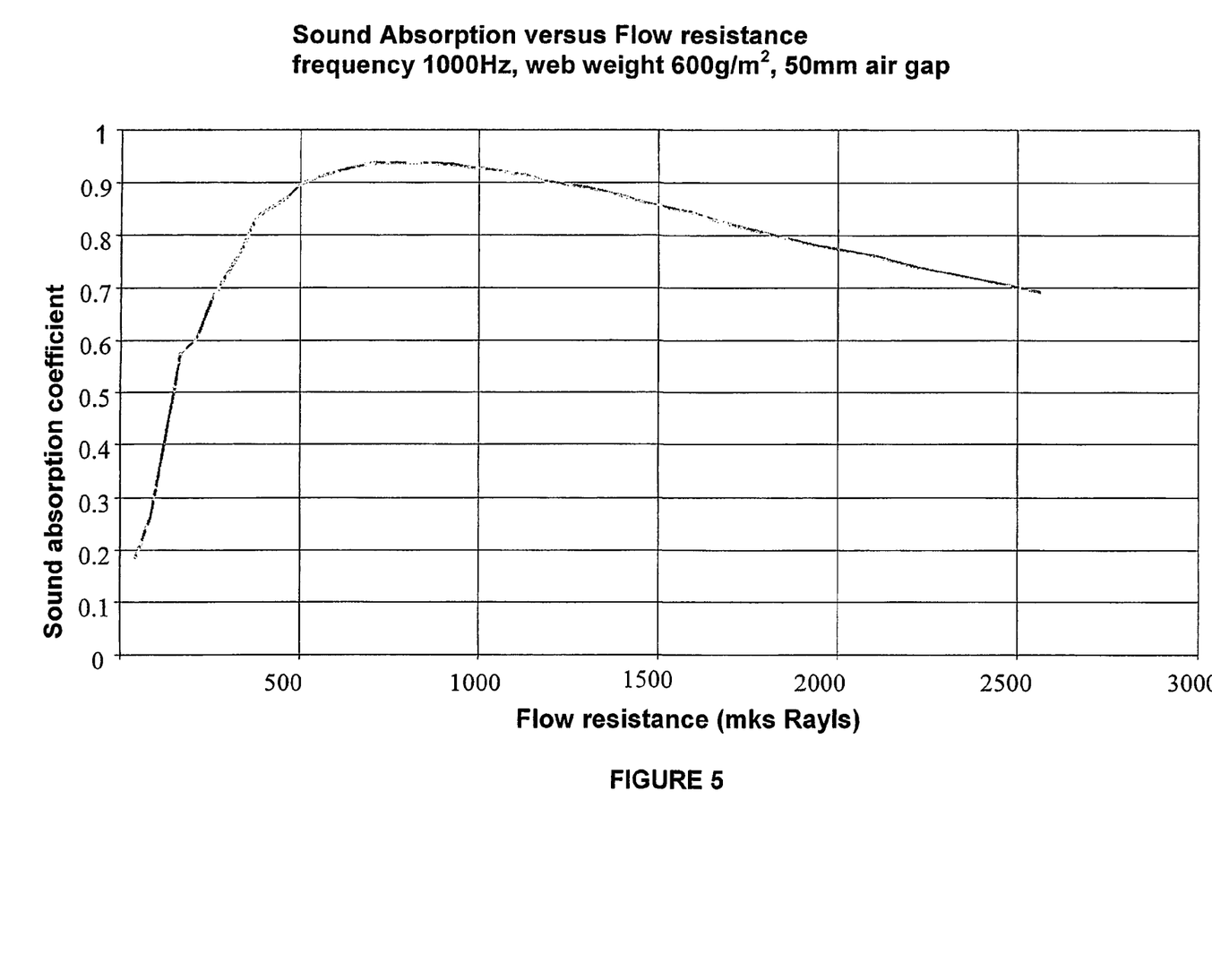
FIG. 5 is a plot of sound absorption versus flow resistance for a range of samples with a web weight of 600 g/m$^2$ at a frequency of 1000 Hz and a 50 mm air gap.
Figure 6:
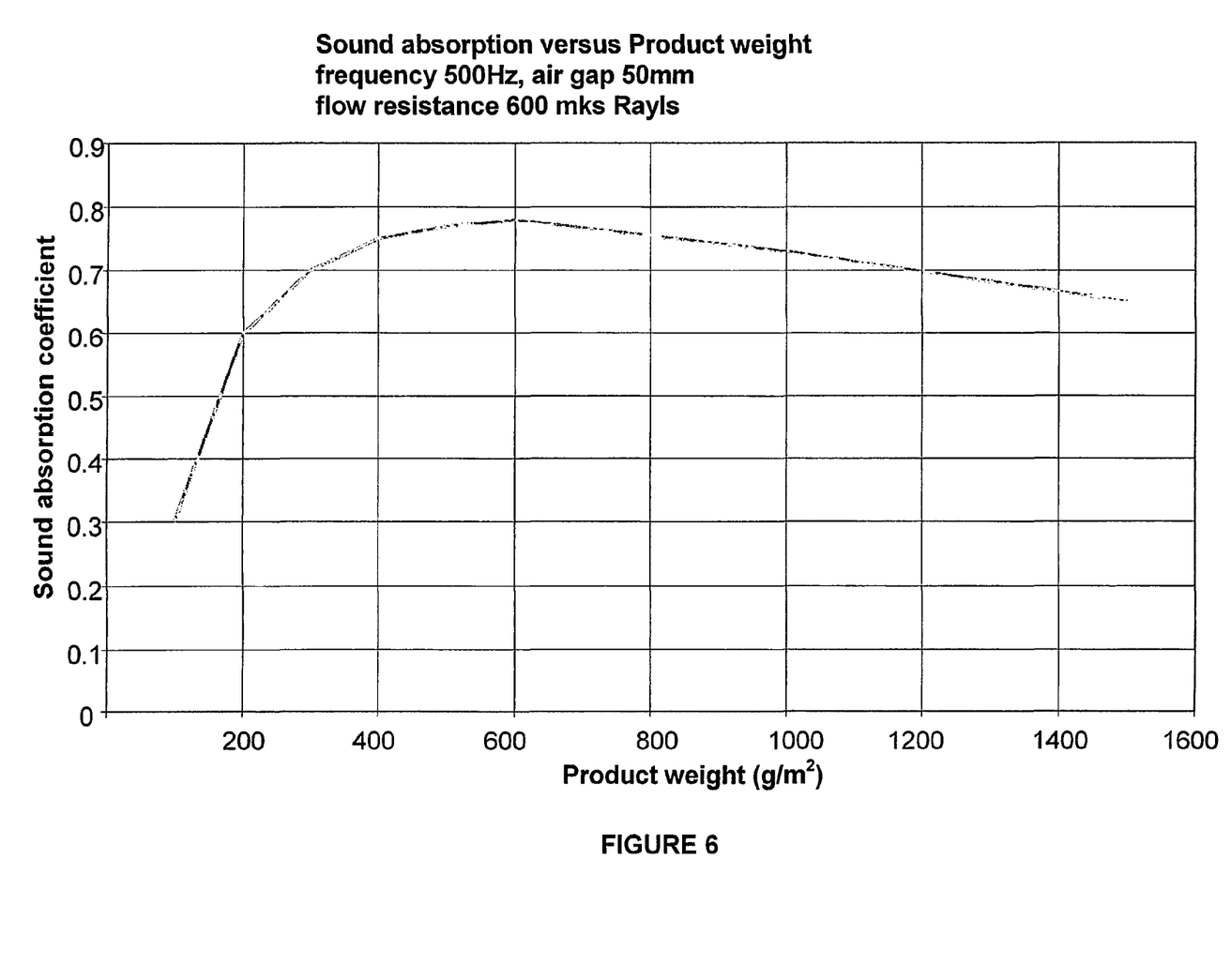
FIG. 6 is a plot of sound absorption versus product weight for a range of samples with an air flow resistance of 600 mks Rayls at a frequency of 500 Hz and an air gap 50 mm.

Test results for a range of acoustic sheets made in accordance with the invention are illustrated in FIGS. 5 and 6. In FIG. 5, a range of samples with a web weight 600 g/m² were tested at a frequency of 1000 Hz with a 50 mm air gap between the sample and a solid surface for their sound absorption coefficient against the air flow resistance. FIG. 6 illustrates the sound absorption coefficient against product weight (g/m²) for a range of samples having an air flow resistance of 600 mks Rayls. The sound absorption coefficients were measured at a frequency of 500 Hz with a 50 mm air gap between the samples and a solid surface.

The air flow resistance is dependent on the ratio of binder matrix to high melt fibre. If a low air flow resistance is required, then a smaller amount of binder is required. For a high air flow resistance, the binder ratio is significantly higher.

Air flow resistance can vary with fibre size and geometry. Larger diameter fibres result in lower air flow resistance through a higher porosity.

The foregoing describes a limited number of embodiments of the invention and modifications can be made without departing from the scope of the invention.

The invention claimed:

1. An acoustic sheet comprising a compressed fibre matrix having high melt fibres and adhesive thermoplastic fibres in which the adhesive fibres are at least partially melted so that the adhesive fibres at least partially coat the high melt fibres and reduce interstitial space in the fibre matrix, the high melt fibres being about 12 denier or below, the adhesive fibres being about 6 denier or below, and wherein the acoustic sheet has a total air flow resistance between 275 and 1100 mks Rayls and a sound absorption coefficient in the range of about 0.2 to about 0.95 at a frequency of 1000 Hz.

2. The acoustic sheet according to claim 1 wherein the thermoplastic fibres are treated with an adhesive coating.

3. The acoustic sheet according to claim 1 wherein the thermoplastic fibres are treated with a coating formed by one or more further webs of thermoplastic fibres.

4. The acoustic sheet according to claim 1 having a total air flow resistance between 600 and 1100 mks Rayls.

5. The acoustic sheet according to claim 1 having a total air flow resistance between 900 and 1000 mks Rayls.

6. The acoustic sheet according to claim 1 having a low sag modulus at temperatures up to 150° C.

7. The acoustic sheet according to claim 1 wherein the high melt fibres have a melting point above about 220° C.

8. The acoustic sheet according to claim 1 wherein the adhesive fibres have a melting point between 100 and 160° C.

9. The acoustic sheet according to claim 8 wherein the adhesive fibres have a melting point between 120 and 150° C.

10. The acoustic sheet according to claim 9 wherein the adhesive fibres have a melting point between 135 and 145° C.

11. The acoustic sheet according to claim 1 wherein the high melt fibres are about 6 denier or below.

12. The acoustic sheet according to claim 1 wherein the high melt fibres are about 4 denier or below.

13. The acoustic sheet according to claim 1 wherein the adhesive fibres are about 4 denier or below.

14. The acoustic sheet according to claim 1 wherein the adhesive fibres are about 2 denier.

15. The acoustic sheet according to claim 1 wherein at least a portion of the compressed fibre matrix is produced from non-woven vertically aligned high loft thermally bonded fibres.

16. The acoustic sheet according to claim 1 wherein the thermoplastic fibres are selected from polyethylene terephthalate (PET), polyethylene butylphthalate (PBT), polyethylene 1,4-cyclohexanedimethanol (PCT), polylactic acid (PLA) and/or polypropylene (PP).

17. The acoustic sheet according to claim 1 wherein the compressed fibre matrix has a weight of about 1000 g/m$^2$ or below.

18. The acoustic sheet according to claim 17 wherein the compressed fibre matrix a weight of about 800 g/m$^2$ or below.

19. The acoustic sheet according to claim 18 wherein the compressed fibre matrix has a weight of about 600 g/m$^2$ or below.

20. The acoustic sheet according to claim 19 wherein the compressed fibre matrix has a weight of about 400 g/m$^2$ or below.

21. The acoustic sheet according to claim 1 further including a flame retardant.

22. The acoustic sheet according to claim 21 wherein the high melt fibres have flame retardant characteristics.

23. The acoustic sheet according to claim 1 wherein the compressed fibre matrix has 50% or more of adhesive fibre or adhesive bicomponent fibre and is compressed at a temperature between 180–220° C. for a period between 1–3 minutes.

24. The acoustic sheet of claim 1 wherein the thermoformed acoustic sheet has a sound absorption coefficient of about 0.6 or greater at 1000 Hz.

25. The acoustic sheet of claim 1 wherein the compressed fibre matrix comprises about 45%, by weight, of the adhesive fibres, and the adhesive fibres are bicomponent fibres.

26. The acoustic sheet of claim 1 wherein the adhesive fibres are bicomponent polyester fibres.

* * * * *

UNITED STATES PATENT AND TRADEMARK OFFICE
CERTIFICATE OF CORRECTION

PATENT NO. : 7,226,656 B2  
APPLICATION NO. : 10/333385  
DATED : June 5, 2007  
INVENTOR(S) : Michael William Coates et al.

Page 1 of 1

It is certified that error appears in the above-identified patent and that said Letters Patent is hereby corrected as shown below:

Column 2, Lines 43-44:
"polyethylene butylphthalate (PBT)" should read, --polybutylene terephthalate (PBT)--.

Column 2, Line 50:
"natural fibre such as wool, hemp, kanet etc." should read, --natural fibre such as wool, hemp, kenaf etc.--.

Column 9, Line 11:
"polyethylene butylphthalate (PBT)" should read, --polybutylene terephthalate (PBT)--.

Signed and Sealed this
Twenty-eighth Day of February, 2012

David J. Kappos
*Director of the United States Patent and Trademark Office*